May 9, 1967 T. O. HALE ETAL 3,317,953
PROCESSING APPARATUS FOR PLASTIC MATERIALS
Filed July 22, 1965 2 Sheets-Sheet 1

INVENTORS
Thomas O. Hale
William E. Webber
BY Jack Sosin
ATTORNEY

May 9, 1967 T. O. HALE ETAL 3,317,953
PROCESSING APPARATUS FOR PLASTIC MATERIALS
Filed July 22, 1965 2 Sheets-Sheet 2

INVENTORS
Thomas O. Hale
William E. Webber
BY
Jack Rosin
ATTORNEY

3,317,953
PROCESSING APPARATUS FOR PLASTIC MATERIALS

Thomas O. Hale and William E. Webber, Indianapolis, Ind., assignors to United States Rubber Company, New York, N.Y., a corporation of New Jersey
Filed July 22, 1965, Ser. No. 473,929
8 Claims. (Cl. 18—2)

This invention relates to improved processing apparatus for plastic materials and, more particularly, to improvements in plastic processing equipment of the type that embody characteristics of a roll mill and a screw extruder.

One example of plastic processing equipment embodying characteristics of a roll mill and a screw extruder (which equipment is hereinafter referred to as a mill-extruder) is the invention of Eugene H. Hartman shown in U.S. Patent No. 2,838,790, dated June 17, 1958, and assigned to the assignee of the present invention. In such a mill-extruder, an extruder screw is provided with a conventional enclosing barrel about its downstream portion, while the upstream portion of the screw is partially exposed from the barrel and cooperates with an adjacent roll. In operation, the screw and the roll are rotated toward each other, and plastic stock is fed to the nip between the screw and the roll in sufficient quantities to form a supply bank thereat. The stock in the bank is continuously drawn into the screw and recirculated back to the bank and, as a result, it is thoroughly mixed and pre-warmed. In addition, the screw continuously and automatically draws the proper amount of plastic stock from the bank and passes this stock through the downstream enclosed portion of the extruder barrel to an extrusion die.

The frame of such a mill-extruder includes a U-shaped, open front, upstream portion having a bottom wall and two end walls which support the roll. It also includes a member which partially encloses the screw and forms a back wall for the U-shaped portion. The configuration of the screw, roll and various walls is such that during normal operation overflow plastic stock, which drops down from the nip between the screw and the roll and accumulates on the bottom wall of the frame, is forced out of the front of the U-shaped frame by the rotating roll. This overflow stock has heretofore become either lost or so contaminated by floor debris as to be unfit for subsequent re-use, causing undesired additional material costs to be incurred during operation of the mill-extruder to replace contaminated stock, and also causing additional labor costs to be incurred in cleaning up the waste.

Accordingly, a principal object of the present invention is to provide improved processing apparatus for plastic materials.

Another object of the present invention is to avoid contamination of overflow stock in processing apparatus for plastic materials.

Still another object of this invention is, on processing equipment having at least two rotary members with a nip therebetween, to provide for the recirculating to the nip of overflow stock developed during processing of plastic materials.

A further object of this invention is to provide an improved mill-extruder that is more economical in operation than former mill-extruders.

Yet another object of this invention is to provide an improved mill-extruder having means to return overflow stock to the input of the mill portion of the mill-extruder.

Additional objects and advantages of this invention will become apparent as the following description proceeds.

Although the invention is described herein in connection with a mill-extruder, it will be apparent that other forms of processing equipment employing rotary members therein can utilize the invention, and it is not intended that the invention be limited to use only with a mill-extruder. For convenience, the material being processed by the mill-extruder is hereinafter considered to be rubber tread stock. However, it is apparent that the invention can be utilized in the processing of numerous other rubber and plastic materials.

While the specification concludes with claims particularly pointing out and distinctly claiming the subject matter regarded as this invention, it is believed that the invention will be better understood from the following description taken in conjunction with the accompanying drawings in which:

Figure 1:
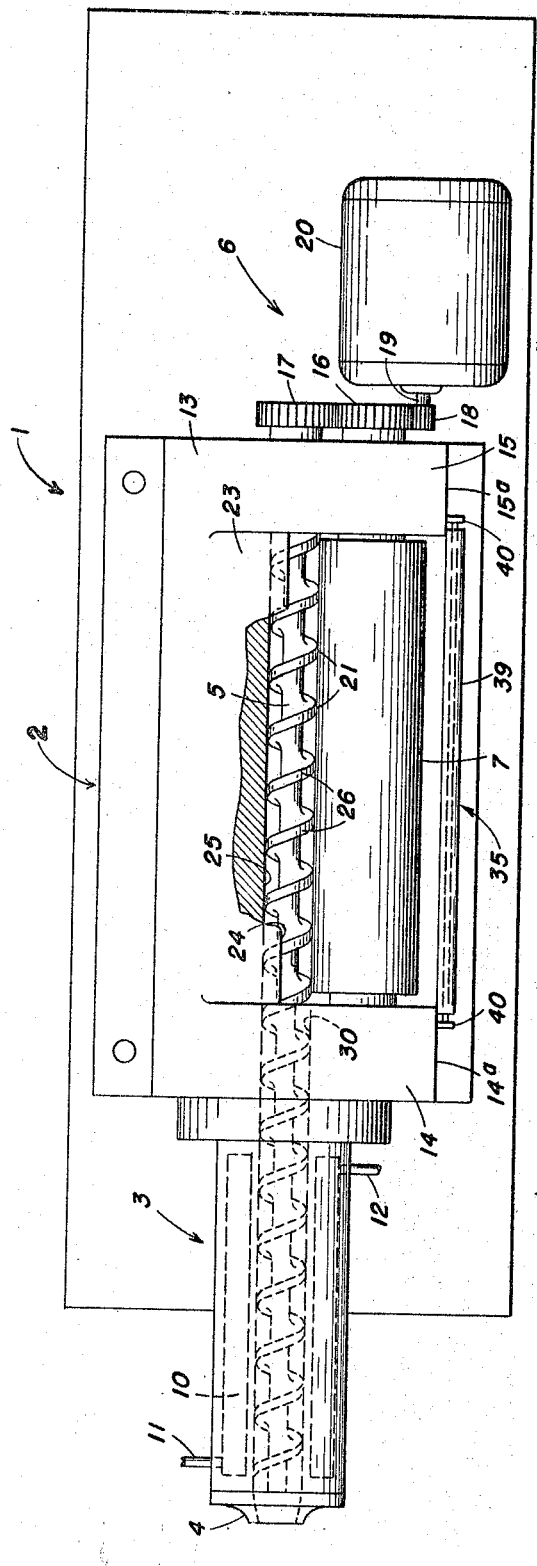
FIG. 1 is a plan view, with parts broken away for clarity, of a mixer-extruder embodying the invention.
Figure 2:
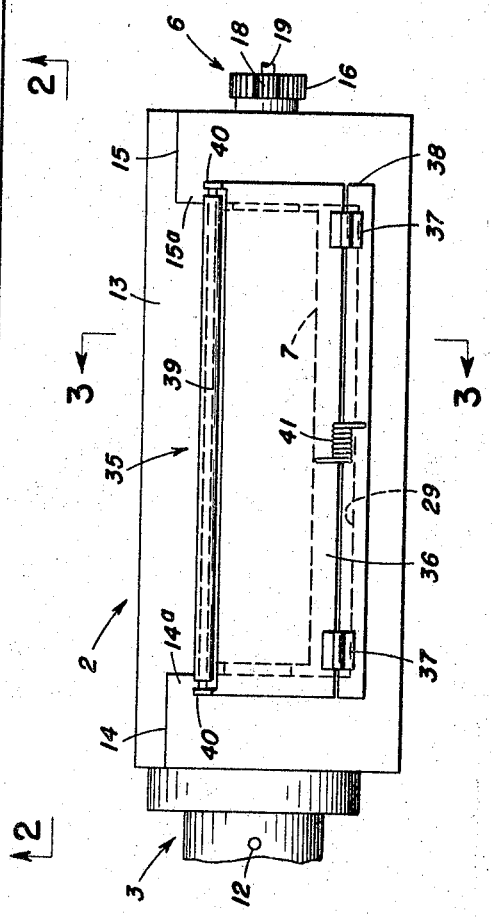
FIG. 2 is a fragmentary front elevational view of the mill portion of the mixer-extruder of FIG. 1.

Referring to the drawings, the mixer-extruder on which the present invention has been illustrated is shown generally at 1. It comprises a feed or mill portion 2 at which rubber stock may be added to the mixer-extruder, and an extrusion cylinder or barrel 3 which has an extrusion die member 4 fastened at its exit or delivery end. A first rotary member or extrusion screw 5 extends lengthwise through the interior of the apparatus from a rotating means or driving assembly 6 located adjacent the mill end of the extruder into proximity with the die 4 on the delivery end. The mill portion 2 of the mill-extruder is open at its top to accommodate a second rotary member or roll 7 that is rotatably mounted adjacent screw 5 with its axis in the same horizontal plane as the axis of the screw.

A rather long portion of screw 5, corresponding to the length of roll 7, is exposed adjacent to roll 7 and cooperates therewith in masticating the rubber stock. The exposed portion of screw 5 also extends over a relatively wide angle circumferentially of the screw, so that a large portion of the screw is exposed lengthwise and circumferentially. The driven roll 7 is mounted beside the exposed portion of the screw in such a manner that the screw and roll together form a mechanism similar to a two-roll mill capable of exerting a milling action on a bank of plastic stock contained above the nip between the screw and the roll. In operation, the screw and the roll are rotated toward each other by the driving mechanism 6, and the rubber stock, which is preferably in the form of a continuous strip 8, is drawn into the nip between the screw and roll. This forms a bank 9 of stock from which screw 5 continuously and automatically draws a proper amount of stock and passes it through the enclosing portion of the extrusion cylinder 3 to the extrusion die 4.

For convenience of description, the right-hand end of the apparatus, as viewed in FIG. 1, will be referred to as the mill or feed end of the apparatus, since the stock is fed to and milled in the apparatus more or less toward this end. Conversely, the left-hand end of the apparatus, as viewed in FIG. 1, will be referred to as the delivery or extruder end of the apparatus, since the stock is urged toward this end as it is processed, and it is finally extruded or discharged at the extreme left-hand end of the apparatus.

For the purpose of maintaining desired temperature conditions during operation of the mixer-extruder, the body of the extrusion cylinder 3 is provided with an internal chamber 10 which is in communication by fluid inlet and outlet lines 11 and 12 with a source of supply (not shown) of steam or other heating medium. Similarly, the heating medium may be circulated through internal chambers (not shown) located within the extruder frame or body 13 and within the roll 7, the latter of which may be provided with suitable rotary couplings (not shown) for the circulation of the heating medium therethrough.

The feed or mill portion 2 of the mixer-extruder 1 is defined between end walls 14 and 15, each of which contains suitable, adjustable bearing supports (not shown) for supporting the roll 7 adjacent to and on an axis parallel to the extruder screw 5. A suitable adjustable bearing support mechanism is shown in said U.S. Patent 2,838,790 to Eugene H. Hartman and the details thereof need not be repeated in this application as they form no part of the present invention.

The end of roll 7 extending outwardly of end wall 15 into the driving assembly 6 carries a gear 16 which meshes with a similar gear 17 carried on the corresponding end of the extrusion screw 5. The roll gear 16 also meshes with a pinion gear 18 which is keyed to the output shaft 19 of a drive motor 20. The arrangement is such that motor 20 causes screw 5 and roll 7 to rotate toward a nip or bite 21 formed between the screw and the roll (that is, the screw rotates in a counterclockwise direction, as viewed in FIG. 3, and the roll rotates in a clockwise direction). In the arrangement shown the roll and the screw are driven at the same angular speed, but the peripheral speed of the roll is greater than the peripheral speed of the screw by reason of the greater diameter of the roll.

An upper longitudinal wall 23 (FIG. 3) of the open mill portion of the extruder body 13 slants downwardly and inwardly toward the extrusion screw 5 and terminates at a point 24 adjacent to the upper surface of the screw, such point 24 being typically some 15° (as measured about the axis of the extrusion screw) spaced from the vertical center line of the screw. A cylindrical recess 25, located at the lower termination of the upper wall 23, partially encloses and accommodates snugly the extrusion screw 5. The outer lands 26 of screw 5 make sliding contact with the wall of the cylindrical recess 25. The lower edge 27 of the screw-accommodating recess 25 is located just below the nip where the screw and the roll nearly contact each other, and such edge serves as a scraping means to direct stock carried on the surface of the roll from the roll into the screw recess 25. Below the scraping edge 27, a longitudinal, generally vertical, back wall 28 of the extruder frame 13 descends steeply from the scraping edge 27 to meet a longitudinal, generally horizontal, bottom wall 29 which also serves as a pan located below roll 7.

The end wall 14 (FIG. 1) is provided with a cylindrical passage 30 which forms a continuation of the extrusion barrel 3 and allows plastic stock to be conveyed from the mill portion 2 of the apparatus through the end wall 14 to the extrusion barrel 3 and the extrusion die 4. The enclosed cylindrical passage 30 forms an axial continuation of the partially cylindrical recess 25. The extrusion screw 5 thus extends the length of the partially enclosing recess 25 and the passage 30, and continues on through the length of the completely enclosing cylinder 3 to the die 4.

In operation of the mill-extruder in connection with the preparation of tread rubber stock, the continuous strip 8 of stock is led toward the nip 21 between the rotating roll 7 and screw 5. The rotation of the roll and screw draws the stock into the nip, and the flights of the screw bite into the stock wherever the stock contacts the screw, forcing the bitten off portions into the recess 25 and the extrusion barrel 3 until the latter is completely filled. Thereafter, a recirculation and mastication of the stock occurs as the flights of the screw cut off more stock from the strip 8 and bank 9 than is discharged through the die 4 at the downstream end of the extruder. Thus, there is a continuous recirculation action in which the stock is taken off the screw, expelled into the bank and retaken into the screw again along the length of recess 25. This causes mastication and working of the stock which serves both to heat the stock and to make the stock more uniform.

During the recirculation of the stock in the bank 9 between the screw and the bank, and while the stock is being fed from the bank 9 to the extrusion end of the apparatus, the action of the mill-extruder is such that a thin lacework of overflow stock 31 adheres to the roll 7 and is carried past the longitudinal scraping edge 27 and deposited in an open space or chamber 32 located below roll 7 and formed by the back wall 28, the bottom wall 29, the end walls 14 and 15 and the roll 7. As more and more overflow stock 31 accumulates at the rear of the chamber 32, the accumulation of overflow stock comes into contact with the bottom of roll 7 and is forced across the bottom wall 29 toward the front (the left side, as viewed in FIG. 3) of the mill portion 2 of the mixer-extruder. Heretofore, this accumulated overflow stock has been allowed to carry over the edge of the bottom wall 29 and fall to the floor. As a result, this overflow stock either has been lost in the past or has become so contaminated by floor debris as to be unfit for re-use.

In order to avoid the loss or contamination by floor debris of the overflow material accumulating on the bottom wall 29, a means, shown generally at 35, for transferring the overflow stock from the bottom wall 29 toward the nip 21 has been provided. The transfer means 35 includes a panel or door 36 which is pivoted at its lower end on hinges 37 to a support plate 38 that is affixed to the end walls 14 and 15 and the bottom wall 29. The upper end of panel 36 is provided with a roller 39 that is supported on the panel by bearings 40.

A spring 41 serves to bias panel 36 toward roll 7 and into engagement with vertical portions 14a and 15a of the respective end walls 14 and 15. The vertical end wall portions 14a and 15a serve as stop means which limit the closest point of approach of the panel 36 toward roll 7.

Figure 3:
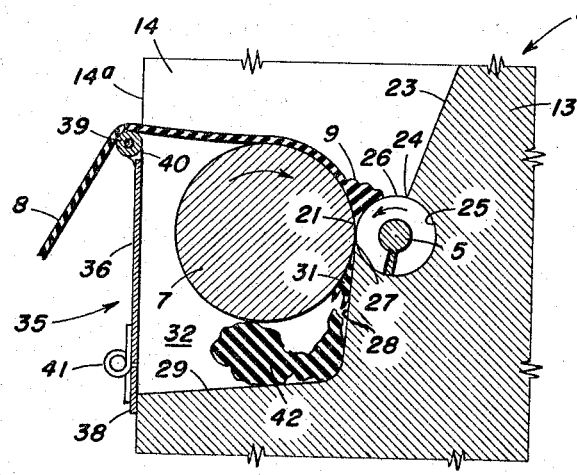
FIGS. 3, 4 and 5 are enlarged sectional, sequential views, taken along the line 3—3 of FIG. 2, showing the manner in which overflow stock is accumulated and returned to the input of the mill portion of the mill-extruder.
Figure 4:
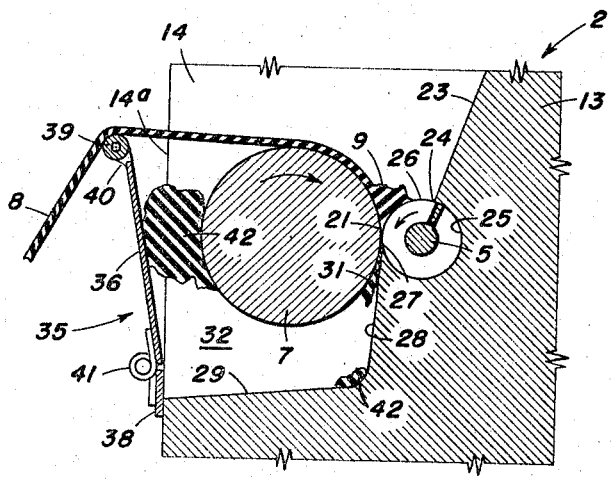
Figure 5:
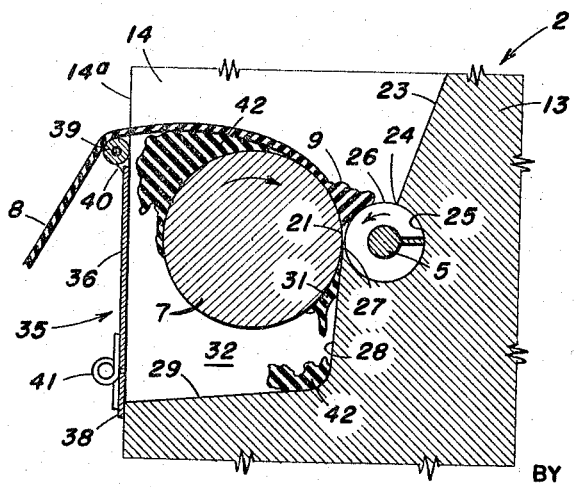

Referring to FIGS. 3, 4 and 5, it will be seen that panel 36 is movable from its normal position adjacent to roll 7, which position is defined by stops 14a and 15a, to a variety of positions further spaced from the roll than the normal position in order to accommodate the passage of masses 42 of overflow stock between the panel and the roll. As indicated earlier, the masses 42 accumulate at the rear of chamber 32 from the overflow stock 31. When each mass 42 reaches a predetermined size, it contacts roll 7 and is moved toward the front of the mill portion 2 of the mixer-extruder. The support plate 38 and the hinged panel 36 then confine the accumulated mass 42 to the front of chamber 32 until the volume of the mass becomes so great that the mass wedges between the moving roll 7 and the hinged panel 36. At this point the interaction of the panel 36 and the roll causes the mass 42 of rubber to roll upward out of the chamber 32. The mass 42 thereafter becomes trapped between the roll 7 and the inflowing feed strip 8 and is eventually carried back into the nip 21 between roll 7 and screw 5.

Accordingly, the mass of overflow stock 42, which formerly would have been lost or contaminated by floor debris and made unfit for re-use, is, by means of the present invention, returned back to the nip for re-use. The operation of the processing equipment having this invention is thus more economical than has heretofore been the case, and less operator effort is required to keep clean the working area in the vicinity of such equipment.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described the invention, what is claimed as new and desired to be protected by Letters Patent of the United States is:

1. Apparatus for processing plastic material, comprising first and second rotary members positioned adjacent one another to form a nip therebetween, one of said members comprising a roll member; frame means for rotatably supporting said rotary members and including a wall member positioned below said nip and in spaced relation thereto for receiving masses of overflow material which drops from said nip; and means including said roll member and a panel member biased toward but variably spaced from said roll member for transferring said masses from said wall member toward said nip.

2. In apparatus for processing plastic materials including a frame, a screw member and a roll member mounted in the frame so as to form a processing nip therebetween, a wall member positioned below the nip for receiving masses of overflow material which drop from the nip, and means to rotate the screw and roll members; the improvement comprising means for returning accumulations of said overflow material to said nip, said means including a movable panel on said frame, said panel being yieldably biased toward a position adjacent to said roll member and co-operable with said roll member to confine said accumulated overflow material between said roll member and said panel and to guide the confined material progressively about said roll member toward said nip.

3. In rubber processing apparatus including a screw member and a roll member, with a nip therebetween, carried in an open front, U-shaped frame having a bottom wall beneath said members, and means to rotate said members; means for returning to said nip overflow stock which drops therefrom and accumulates on said bottom wall, comprising a panel hinged to the front of said bottom wall and yieldably biased toward a position adjacent said roll member, said panel being movable away from said position and co-operable with said roll member to confine a mass of overflow stock between said roll member and said panel and to guide the confined material progressively about said roll member from said bottom wall toward said nip.

4. Apparatus for processing rubber, comprising: a frame having first and second spaced end walls, a bottom wall extending longitudinally between said end walls to form with said end walls a generally U-shaped structure, and a rear wall extending upwardly from said bottom wall and longitudinally between said end walls; a roll; a screw, said roll and said screw being rotatable about parallel axes extending between said first and second end walls, said screw being partially encircled by said rear wall, said roll and said screw co-operating with one another in processing rubber stock received at a nip therebetween; means to rotate said roll and said screw; and means for returning to said nip overflow stock which drops from said nip and accumulates on said bottom wall, said means including a front wall member hinged at one of its ends to said bottom wall and resiliently biased toward said roll, said front wall member being movable toward and away from a position adjacent said roll to accommodate the return of masses of said overflow stock confined between said roll and said front wall member, the rotation of said roll causing the confined material to progressively move about said roll from said bottom wall toward said nip.

5. In an apparatus for simultaneously milling and extruding a rubber stock and including a milling portion defined by two relatively widely spaced transverse end walls, a longitudinal rear wall and a longitudinal bottom wall extending between said end walls, the rear wall having a downwardly and inwardly slanting portion terminating at an edge defining the upper edge of a longitudinal recess in the rear wall, the recess having a cross-section of a partial circle, a longitudinal extrusion screw disposed snugly within the recess so as to be completely enclosed and supported over the lower half of its periphery and partially enclosed over the upper portion of its periphery, the upper front portion of the screw being unenclosed by the recess and protruding therefrom to present an exposed arc of the screw, the lower edge of the recess forming a scraping edge at a line along the periphery of the screw, the rear wall continuing downwardly from the lower edge of the recess to join the bottom wall, the bottom wall extending forwardly to the front of the milling portion of the apparatus, a roll extending longitudinally between the ends walls above the bottom wall and disposed in close proximity to the scraping edge and the exposed portion of the screw and forming a nip with said exposed portion of the screw, means for rotating the roll and screw toward each other whereby rubber stock added to the milling portion forms a bank and is masticated between the screw and the roll, the nip and scraping edge serving to direct rubber stock from the bank into the troughs of the screw, the apparatus further including an extruding portion defined by an extrusion barrel positioned adjacent one of the end walls and extending longitudinally thereof, the screw extending out of the milling portion of the apparatus into the extrusion barrel of the extrusion portion of the apparatus and being completely enclosed by the barrel, and a die attached to the delivery end of the barrel for shaping stock delivered thereto by the action of the screw, the improvement comprising: an upwardly extending panel pivoted at one of its ends to said bottom wall at the front of the milling portion of the apparatus; means to resiliently bias said panel toward said roll; stop means for normally retaining said panel adjacent to but spaced from said roll, said rear wall, bottom wall, end walls and panel forming with said roll a chamber wherein overflow stock which drops from said nip and said scraping edge accumulates into masses, said masses being confined in said chamber and when of sufficient volume being wedged between said moving roll and said walls and panel of said chamber, the interaction of the walls and panel and roll on the masses causing the masses to move upwardly between said panel and said roll.

6. Apparatus for processing plastic material, comprising first and second rotary members positioned adjacent one another to form a nip therebetween; frame means for rotatably supporting said rotary members and including a wall member positioned below said nip on which masses of overflow material tend to accumulate; and means including one of said rotary members and a panel member biased toward but variably spaced from said one of said rotary members for transferring said masses from said wall member toward said nip, said transferring means comprising a panel pivoted at one of its ends to said frame means and provided at the other of its ends with a roller for guiding a feed strip of plastic material to said nip, said masses of overflow material being confined between said panel and said one of said rotary members during a first portion of the movement toward said nip and being confined between said feed strip of plastic material and said one of said rotary members during a second portion of said movement.

7. In apparatus for processing plastic materials, including a frame, a pair of rotary members mounted in the frame so as to form a processing nip therebetween, and means to rotate the rotary members; the improvement comprising means for returning to said nip overflow material which drops from said nip, said means including a movable panel on said frame, said panel being resiliently biased toward a position adjacent to one of said rotary members and cooperable with said one rotary member to confine accumulated overflow material between said one rotary member and said panel, the rotation of said one rotary member causing the confined material to progressively move about said one rotary member toward said nip, said one rotary member being a roll and said other rotary member being a screw, said panel being hingedly connected to said frame at one of its ends and being provided with a roller at the other of its ends, said roller serving to guide a feed strip of plastic material to said nip, the returning overflow material being confined between said feed strip of plastic material and said roll during its movement between said roller and said nip.

8. In rubber processing apparatus including a pair of rotary members, with a nip therebetween, carried in an open front, U-shaped frame having a bottom wall beneath the rotary members, and means to rotate the rotary members; means for returing to said nip overflow stock which drops therefrom and accumulates on said bottom wall, comprising a panel hinged to the front of said bottom wall and spring-biased toward a position adjacent one of said rotary members, said panel being movable away from said position and cooperable with said one rotary member to confine a mass of overflow stock between said one rotary member and said panel, the rotation of said one rotary member causing the confined material to progressively move about said one rotary member from said bottom wall towards said nip, said one rotary member being a roll and said other rotary member being a screw, the hinged connection of said panel to said bottom wall being at one end of said panel and said panel being provided with a roller at the other of its ends, said roller serving to guide a feed strip of plastic material to said nip, the returning overflow material being confined between said feed strip of plastic material and said roll during its movement between said roller and said nip.

References Cited by the Examiner
UNITED STATES PATENTS

| | | | |
|---|---|---|---|
| 1,179,922 | 4/1916 | Hottman. | |
| 1,422,561 | 7/1922 | Gomersall | 18—2 X |
| 1,689,990 | 10/1928 | Banbury | 18—2 |
| 2,838,790 | 6/1958 | Hartman | 18—12 X |
| 2,875,469 | 3/1959 | Davis | 18—2 |
| 2,941,239 | 6/1960 | Theysohn | 18—2 |
| 2,994,100 | 8/1961 | Comes et al. | 18—2 |

References Cited by the Applicant
UNITED STATES PATENTS 2,540,195   2/1951   Engler.

WILLIAM J. STEPHENSON, *Primary Examiner.*

J. SPENCER OVERHOLSER, *Examiner.*